United States Patent [19]

Poitier

[11] Patent Number: 4,664,551
[45] Date of Patent: May 12, 1987

[54] CONNECTING DEVICE FOR HOUSING-SHAPED ELEMENTS

[75] Inventor: Gérard Poitier, Gennevilliers, France

[73] Assignee: Societe Anonyme des Usines Chausson, Asnieres, France

[21] Appl. No.: 756,843

[22] Filed: Jul. 19, 1985

[30] Foreign Application Priority Data

Jul. 24, 1984 [FR] France .................................. 84 11731

[51] Int. Cl.⁴ .................................................. F16B 17/00
[52] U.S. Cl. .................................... 403/335; 403/375
[58] Field of Search .............. 403/339, 340, 338, 364, 403/335, 315, 354, 326, 374, 375, 381

[56] References Cited

U.S. PATENT DOCUMENTS

| | | | |
|---|---|---|---|
| 3,520,082 | 7/1970 | Smith | 403/375 |
| 3,556,229 | 1/1971 | Hawkins | 403/338 |
| 4,146,258 | 3/1979 | Andruchiw | 403/338 |
| 4,351,390 | 9/1982 | Argyle et al. | 403/338 |
| 4,367,979 | 1/1983 | Milligan | 403/315 |

FOREIGN PATENT DOCUMENTS 2505268 11/1982 France ................................ 403/364

Primary Examiner—Cornelius J. Husar
Assistant Examiner—Peter M. Cuomo

[57] ABSTRACT

The connecting device for housing-shaped elements and the application thereof to the making of housings for air conditioning systems for vehicles is characterized in that one of the elements has a projecting lip (8) thereon, while the other element has a receiving flange for the projecting lip (8) bearing (14) and retaining (19, 21) means being provided alternately between the projecting lip (8) and the receiving flange.

5 Claims, 11 Drawing Figures

U.S. Patent  May 12, 1987  4,664,551
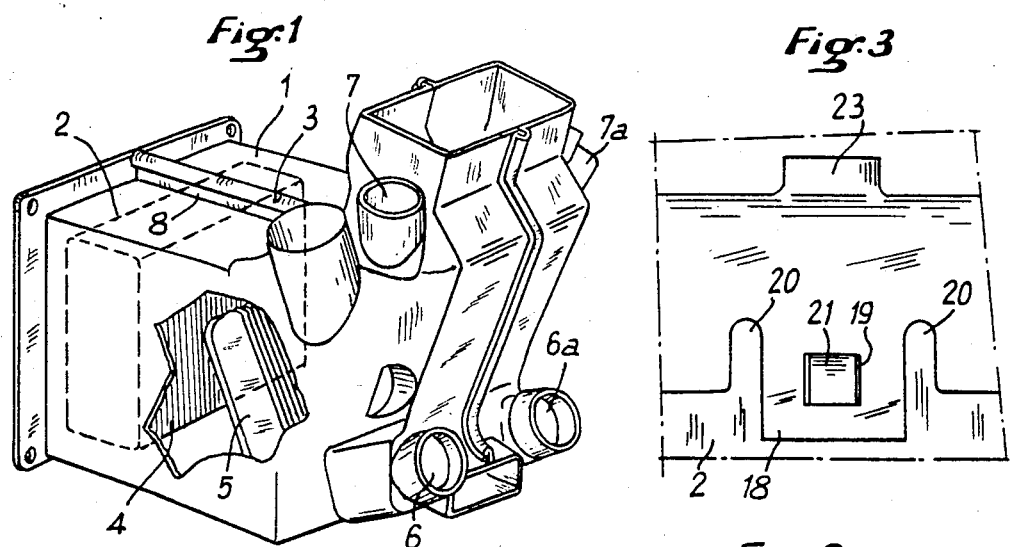
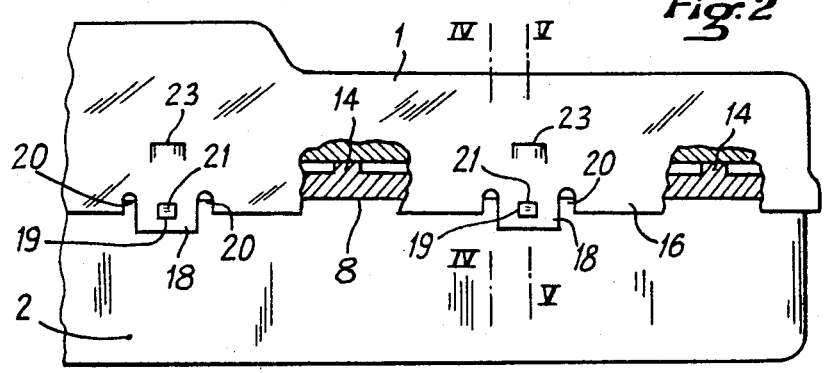
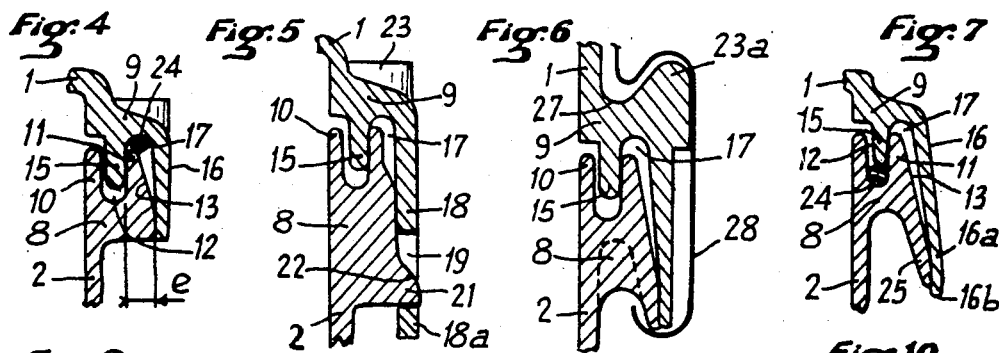
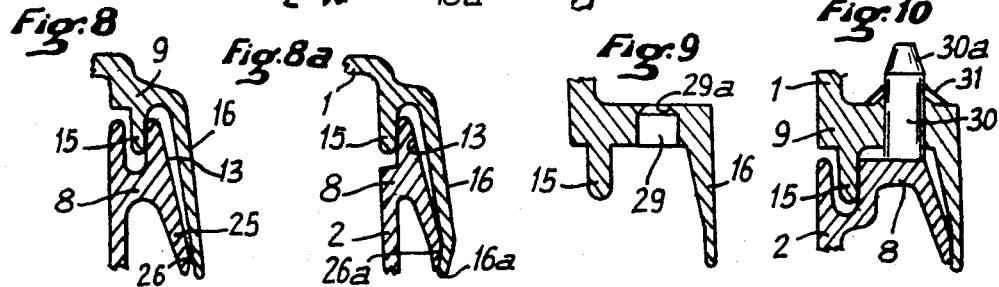

4,664,551

CONNECTING DEVICE FOR HOUSING-SHAPED ELEMENTS

FIELD OF THE INVENTION

The present invention relates to a connecting device for the mounting of housing elements, for example elements adapted to define the housing or casing of an air conditioning system for a vehicle.

BACKGROUND OF THE INVENTION

The currently produced devices either include resilient seals which are pressed between the corresponding portions of housing halves, or need very close adjustment workings for obtaining a satisfactory air-tightness.

The housings for the above-mentioned application, as well as many other housings for containing various parts are more often made of molded synthetic material, and it often happens that the corresponding portions of housing halves exhibit important dimension differences.

This is especially the case for rectilinear connecting portions, which often tend to form a bend with more or less deflection, so that it becomes necessary in practice to provide securing clips or to carry out relatively complex clamping.

OBJECTS AND SUMMARY OF THE INVENTION

The present invention overcomes the above-mentioned disadvantages.

According to this invention, the connecting device for housing-shaped elements and the application thereof to the making of housings for air conditioning systems for vehicles is characterized in that one of the elements has a projecting lip thereon, while the other element has a receiving flange for the projecting lip, bearing and retaining means being provided alternately between the projecting lip and the receiving flange.

Various other features of this invention will be more clearly understood when reading the following detailed description.

BRIEF DESCRIPTION OF THE DRAWINGS

Embodiments of this invention are shown in the appended drawings, and are to be considered as not limitative examples.

FIG. 1 is a perspective view of a housing for an air conditioning system for a vehicle embodied according to this invention, FIG. 2 is a diagrammatic partial plan view, partly cut away, illustrating specific features of this invention, FIG. 3 is a partial plan view, at an enlarged scale, of a detail of FIG. 2, FIG. 4 is a cross-section view according substantially to line IV—IV of FIG. 2, FIG. 5 is a cross-section view according substantially to line V—V of FIG. 2, FIG. 6 is a cross-section similar to FIG. 5, illustrating a development of this invention, FIGS. 7 and 8, 8a are cross-sections similar to FIG. 5, illustrating additionnal features of this invention, FIG. 9 is a partial cross-section, similar to FIG. 5, of an alternative embodiment, and FIG. 10 is a cross-section similar to FIG. 5, showing the way to utilize the alternative embodiment of FIG. 9.

DETAILED DESCRIPTION OF THE INVENTION

FIG. 1 shows a housing constructed of two elements 1 and 2 which are complementary and which are secured together by means of a connecting device 3.

In the assembly shown, the housing is adapted to receive various apparatus, such as heat exchangers 4, 5 for heating and/or cooling air to be supplied inside a vehicle through connectors 6, 6a, 7, 7a...

Elements 1 and 2 are made by molding of synthetic material, such as a thermoplastic resin.

One of the elements, for instance element 1, defines a connecting portion in the form of projecting lips 8, and the other element defines a receiving flange 9; lip 8 and flange 9 are more often horizontal, but they may be vertical as well.

At its ends, projecting lip 8 has two ribs 10 and 11 with a groove 12 therebetween.

The external side 13 of rib 11 defines a ramp which slopes from the end to the base.

The heights of ribs 10 and 11 are preferably the same, and one of these ribs, preferably rib 10, has thereon from place to place a projecting finger 14 (FIG. 2).

Receiving flange 9 defines a median rib 15 the thickness of which is smaller than the width of groove 12.

Moreover, receiving flange 9 defines a depending edge 16 which is separated from median rib 15 by a groove 17. The width of groove 17 is smaller than the thickness e between the external side of groove 12 and the most projecting portion of the external side 13 which defines rib 11.

In this way, and as shown in the figures, when element 1 is brought against element 2, rib 15 bears onto the external side which defines groove 12, while the internal side of the depending edge 16 bears onto the external ramp-shaped side 13.

Since the plastic material which constitues elements 1 and 2 is resilient and elastic, and since the external side 13 forms a ramp, then rib 11 is pressed between rib 15 and depending edge 16, which leads to the cancellation of the clearances which can result from the manufactuing tolerances as ribs 10, 11 and 15 do not contact the bottom of corresponding grooves.

FIGS. 2 and 3 show that element 1 defines from place to place lugs 18 having an opening 19 therethrough. In order to render lugs 18 more resilient, it is advantageous to provide notches 20 on either side of each of them.

The number of lugs 18 corresponds to the number of projecting fingers 14, and the latter are located approximately halfway between each pair of lugs 18.

Projecting lip 8 has thereon protrusions 21 which coincide with openings 19 in lugs 18.

As shown in FIG. 5, protrusions 21 preferably have an external side 22 in the form of a ramp, which enhances the deflection of lugs 18 when element 1 is inserted onto element 2.

Since at least one projecting finger 14 is provided between each pair or protrusions 21, and in view of the respective positions of projecting fingers 14 and protrusions 21, a fairly large force has to be exerted onto the receiving flange 9 in order to allow the engagement of protrusions 21 into openings 19.

Element 1 is advantageously provided with anvils 23 (FIGS. 2, 3 and 5) which allow to exert a thrust for placing more easily protrusions 21 into openings 19 by means of a resilient deflection of receiving flange 9.

The above discussion and the drawing show that elements 1 and 2 bear against each other through small surface portions which can be assimilated to punctual elements and which are positionned alternately.

The fact that a resilient deflection of the nested portions is generated cancels any construction clearance and prevents any vibratory movement between elements 1 and 2, which completes the damping which is already obtained be the pressure exerted on rib 11 by rib 15 and depending edge 16.

Depending edge 16 extends on the whole length of the connection between elements 1 and 2, and the resilient action of said depending edge 16 on the ramp which is defined by the external side of rib 11 provides a connection with a satisfactory air-tightness.

When it is desired, the above connection can be made water-tight as well, by positionning a seal in the bottom of groove 12 (FIG. 7) or groove 17 (FIG. 4).

In order to improve the air-tightness as well as to render the connection more resilient, rib 11 may be extended by a projecting edge 25; in a similar manner, depending edge 16 is then extended as indicated in 16*a*, so as to extend substantially as far as the lower portion of lugs 18. In this way, the connection as seen from outside forms a continuous line bounded by the end 16*b* of depending edge 16*a*.

FIG. 8 shows that edge 25 may be provided on the outside with a rim 26 providing a linear bearing for depending edge 16. This arrangement improves the connection tightness. FIG. 8*a* shows that the end 16*b* of depending edge 16 may bear on a narrowed bearing surface 26*a*, and that rib 10 may be eliminated.

The above description show that the described connections allow for a dismounting of elements 1 and 2.

That is, when looking at FIG. 5, it is sufficient to move away the lower portion 18*a* of lugs 18 for releasing the latter from protrusions 21.

In certain cases, it may happen that a lug 18 becomes broken. To overcome this disadvantage, and as shown in FIG. 6, it is possible to provide anvils 23*a* with a rounded shape and to separate them from the element wall only with a groove 27.

Anvils 23 thus allow to place clamps 28, for instance metallic clamps, if necessary.

FIGS. 9 and 10 illustrate an alternative embodiment wherein the receiving flange 9 has therein from place to place holes 29 which define a narrowed portion 29*a*.

Further, on projecting lip 8 are provided pins 30 with a conical end 30*a*. The diameter of pins 30 is chosen equal to the one of holes 29, and this results in a deformation of narrowed portion 29*a* when pins 30 are engaged. This arrangement provides a good tightness of the connection. To improve the connection, it is further possible to place conical washers 31 inserted on the projecting end of pins 30.

What is claimed is:

1. A connecting device for housing-shaped elements comprising:
    a resilient receiving flange having a downwardly depending first rib and a downwardly depending edge portion extending a length, longer than said first rib, said first rib and said edge portion being separated by a first groove;
    a resilient projecting lip having an upwardly extending second rib of a width smaller than that of said first groove, said second rib being tapered downwardly along a side thereof facing said edge portion and defining thereby a ramp shaped wall portion, so as to extend laterally for a distance greater than the width of said first groove, and said second rib having a length just less than the length of said edge portion, said resilient projecting lip being adapted to mate with said resilient receiving flange so that said second rib extends upwardly just short of a bottom portion of said first groove; and
    a plurality of bearing and retaining means intermediately provided between said resilient projecting lip and said resilient receiving flange, with said depending edge portion of said resilient receiving flange resiliently urging said second rib against said first rib on said ramp shaped wall portion.

2. The device of claim 1, wherein said bearing means comprise protrusions and projecting fingers on said resilient projecting lip and said retaining means comprise lugs, defining openings therein, on said resilient receiving flange, said projecting fingers, protrusions, lugs and openings being positioned so that said protrusions extend into said openings on said lugs in a snap-fit upon engagement of said resilient projecting lip and said resilient receiving flange.

3. The device as set forth in claim 2, further comprising anvils formed on top of said resilient receiving flange and in alignment with said openings.

4. The device as set forth in claim 3, wherein said anvils project beyond a second groove and said second groove and said anvils define means for holding a clamp connecting said resilient receiving flange and said projecting lip.

5. The device as set forth in claim 1, wherein said bearing means comprise pins formed on said resilient projecting lip and said retaining means comprise means defining holes in said resilient receiving flange corresponding to said pins, said holes having resilient portions narrower than said pins.

* * * * *